2,804,044
Patented Aug. 27, 1957

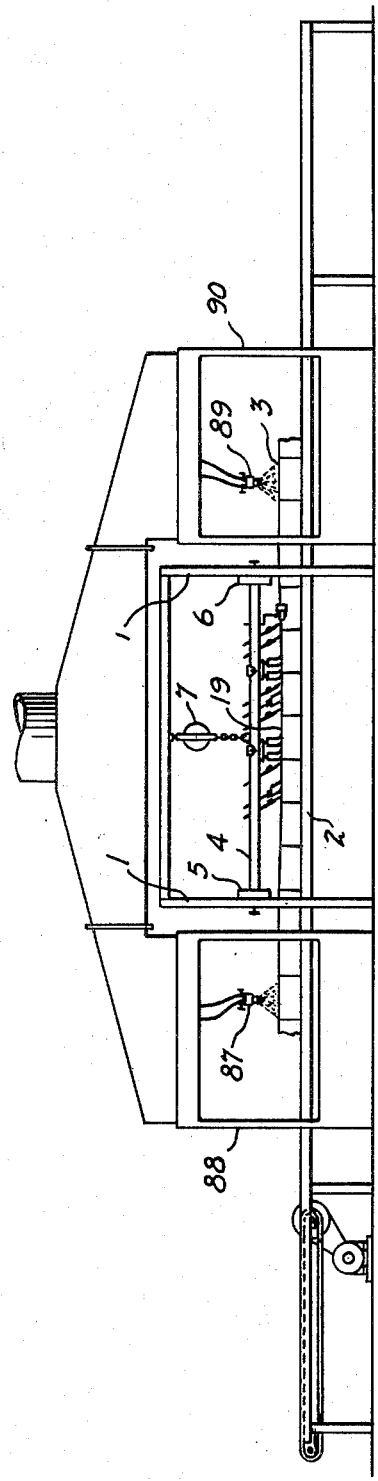

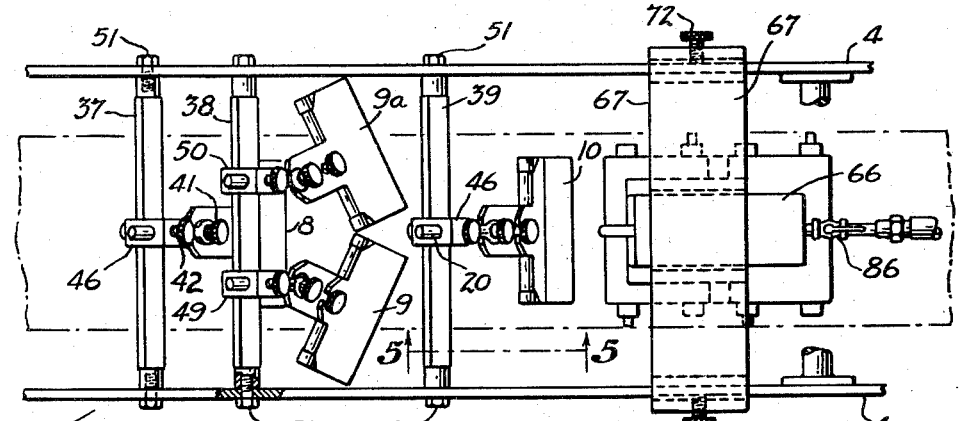
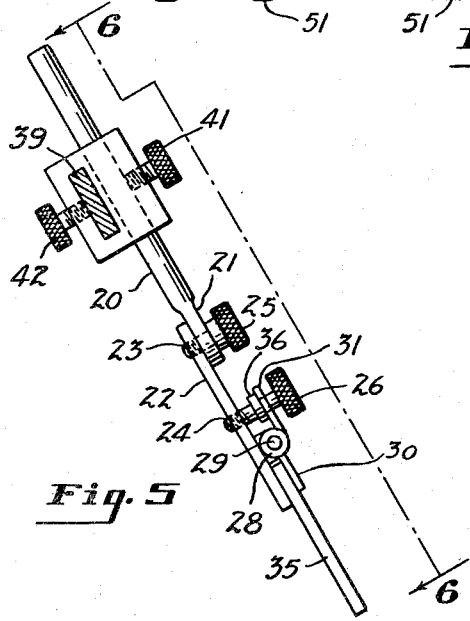
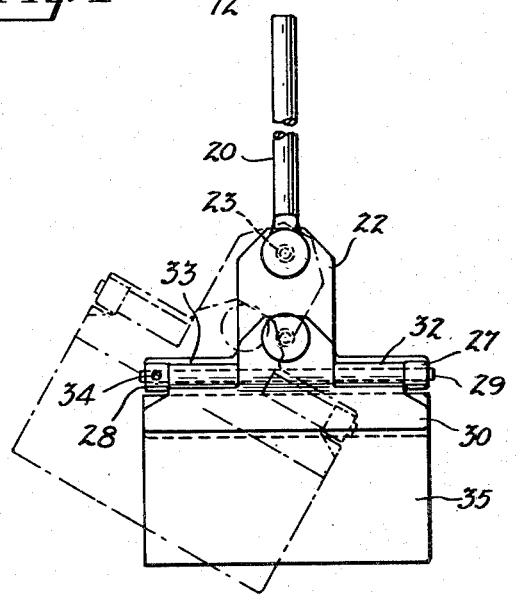
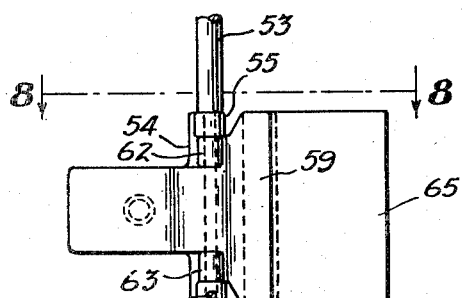
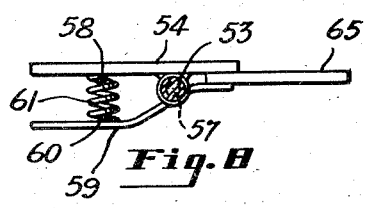

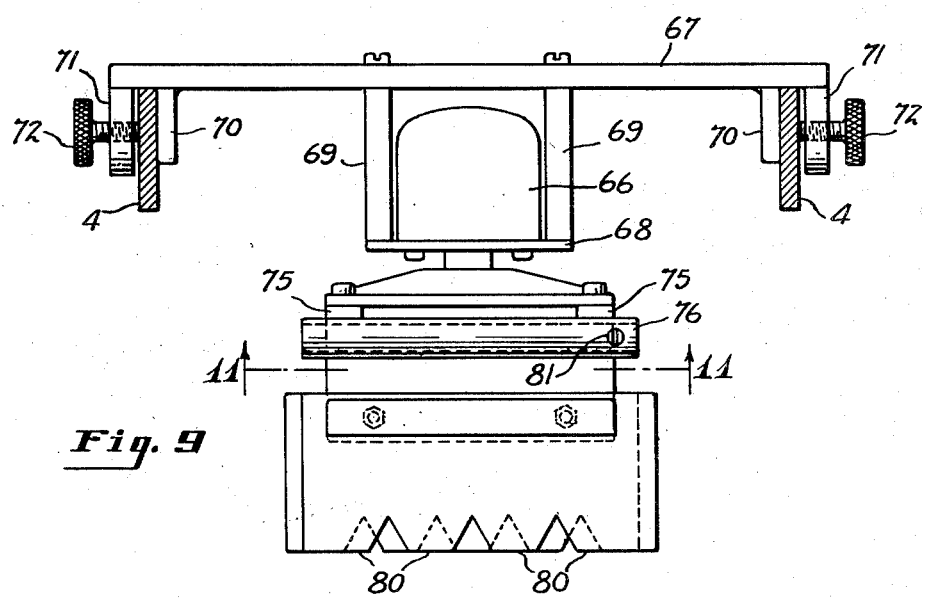
Fig. 9
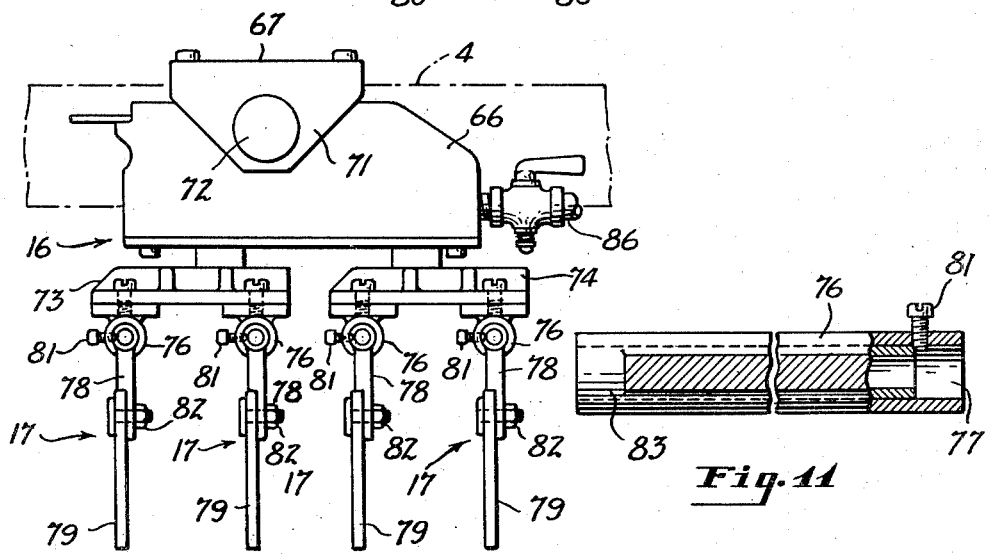
Fig. 10
Fig. 11

United States Patent Office

2,804,044
BLOCK COATING APPARATUS

Hans J. Asbeck, Lakewood, Ohio, and Noel D. Harter, Oklahoma City, Okla., assignors to The Sherwin-Williams Company, Cleveland, Ohio, a corporation of Ohio Application June 22, 1954, Serial No. 438,472

7 Claims. (Cl. 118—120)

This invention relates, as indicated, to mechanical equipment useful in producing coated building blocks as a continuous operation. Primarily, the equipment with which this invention is concerned is for the purpose of coating building blocks commonly known as concrete or cinder blocks although it will be readily apparent that the same or similar type of equipment may be used in coating blocks of different porous materials, such as, bricks, wooden blocks, wood sheets, plaster board, etc.

Application of chemically hardening resinous coating compositions to porous substrates is not a simple matter of spraying the resinous material with the hardening agent admixed onto the surface and allowing it to harden spontaneously. If a smooth or substantially smooth finish is desired, the pores must be filled by mechanical action to provide a substantially smooth surface and the finish coat applied thereover. It has been found, particularly with the chemically hardening resins, that simple squeegeeing or doctoring of a filler material (usualy a resinous composition similar to the finish coat) over the surface to be coated is not sufficient. This type of treatment yields a surface which is substantially smooth, but the coating is imperfect in that an unacceptably large number of pinholes or craters occur. A principal problem which had to be solved was the design of equipment which would eliminate insofar as possible the tendency toward pinholing of chemically hardening coating compositions over a porous substrate.

In most cases, the chemical action of the hardening agent with the resin causes the liberation of heat. The heat causes the air in the pores to expand, and if the pore has no opening except that covered by the paint film, the expanding air will cause a blister or a pin-hole. A typical example of a chemically hardening resinous material is the polyglycidyl polyether of a polyhydric phenol, and the curing or hardening agent therefor is usually an aliphatic polyamine, e. g., ethylene diamine.

The structure of concrete or cinder blocks varies widely in different localities. Many factors affect the nature of the surface such as the aggregate used, the process of casting, the amount of water retained in the block, the presence or absence of heat treatment, etc. Pore size, and the ratio of pocket-type pores with but one opening to the surface and pores with more than one opening permitting the escape of air or equalization of pressure, are determined by factors such as those mentioned. On a block which is particularly "tight," i. e., smoke can't be blown through the block, the ratio of pocket-type pores is high and blistering and pin-holing a serious problem.

If the pocket-type pores can be substantially filled, as opposed to bridged, by a suitable filler material, then the problem of pin-holing and blistering should be substantially solved.

The present invention, therefore, has as its principal objective the provision of a mechanical device which is capable of filling a porous substrate in such a way that blistering and pin-holing are minimized.

Other objects will appear as the description proceeds.

To the accomplishment of the foregoing and related ends, said invention, then, consists of the means hereinafter fully described description setting forth in detail certain illustrative embodiments of the invention, such disclosed means constituting, however, but a few of the various forms in which the principle of this invention may be employed.

Broadly stated, this invention comprises a squeegee unit for filling porous blocks comprising an alternate series of stationary and vibratable squeegee means and a conveyor for moving said blocks in contact with said squeegees.

Fig. 1 is a front elevational view of the coating machine, including the squeegee unit;

Fig. 2 is a front view of the squeegee frame, showing the squeegees in place;

Fig. 3 is a top plan diagrammatic view showing the pattern of the wiping action of the squeegees;

Fig. 4 is an enlarged top plan view of one complete section of squeegees taken on line 4—4 of Fig. 2;

Fig. 5 is a side view of the adjustable squeegee;

Fig. 6 is a front view of the adjustable squeegee, showing by dotted line, the squeegee blade in an offset position;

Fig. 7 is a side view of a side squeegee;

Fig. 8 is a top view of a side squeegee taken on the line 8—8 of Fig. 7;

Fig. 9 is a front view of the vibrating squeegee unit taken on the line 9—9 of Fig. 2;

Fig. 10 is a side view of the vibrating squeegee unit and;

Fig. 11 is a view of the vibrating squeegee holding means taken on the line 11—11 of Fig. 9.

A suitable machine for coating cementitious or siliceous building block and incorporating the novel equipment of this invention has for its principal component a long conveyor, one end of which is power driven. Since some blocks have projections or "wet edges," which if allowed to remain on the surface will cause unevenness, it is often desirable to sand or otherwise grind the surface to remove them and for this purpose sanding equipment and dust removing equipment may be used. The filler coat may then be applied directly to the block either by spray or other suitable means. The blocks with the filler, usually applied in an excess, then proceed along the conveyor to the squeegee unit where the special filling operation is performed. The equipment for this operaton is more particularly described herein. Following the squeegee operation which produces a substantially smooth surface on the block, the prepared surface is spray coated with the finish coat and the blocks removed from the conveyor and stacked in suitable racks for drying. With more particular reference to the drawings, Figs. 1 and 2 show a side view of one form of squeegee unit for performing the filling operation. There is shown a frame 1, through which passes a conveyor 2 carrying blocks 3. It is desirable that the conveyor 2 be power driven at the beginning portion thereof, such as through the sanding and dust removing operation, if employed. The blocks 3 are consequently pushed over the remainder of conveyor 2 through the spraying and squeegeeing operations in tightly abutting relationship, thereby preventing the flow of filler material in between such blocks 3.

In operation, the blocks 3 have had deposited on their surface a slight excess of filler resin just prior to entry into the squeegee unit. A rack 4 is disposed substantially parallel to and above the conveyor 2 and is adjustably supported at its ends 5 and 6 within the frame 1. Suitable means, such as a chain hoist 7, may be used for raising and lowering the rack 4 within the frame 1 to adjust for different sizes of blocks. The rack 4 is generally rectangular in shape as shown in Fig. 4 and provides a suitable structure for adjusting a plurality of adjustable squeegees 8–15 and at least one mechanically driven squeegee unit 16, having one or more flexible blade squeegees 17 affixed thereto. In the specific embodiment shown in Fig. 1, the rack 4 supports ten simple squeegees and two mechanically driven squeegee units 16, each of which has four flexible blade squeegees 17. Also shown in Figs. 1 and 2 are two edge or side squeegees 18 which are present for the purpose of wiping the edges of the block to prevent pile up of filler on the sides.

The arrangement of these squeegees 8–15 as shown in Figs. 2 and 4 is for the purpose of moving the filler back and forth over the surface a number of times. Any other arrangements of the squeegees may be employed provided the transverse motion of filler material is secured. A pile of filler moving under the first squeegee 8 (travelling from left to right) is moved outwardly toward the edges of the block forming two ridges of filler at the outer extremities of the flexible blade of such squeegee, which does not extend clear to the edges of the block. These ridges are picked up by the angularly disposed squeegees 9 and 9A (shown in Fig. 4), the blade portions of which overlap the edges of the block adjacent and direct the filler inwardly from the edges of the block, yielding tracks of filler centrally of the block proceeding from the inward edges of the block portion of the angularly disposed squeegees 9 and 9A.

Another squeegee 10 of the same design as 8 picks up the central tracks of filler and moves them outwardly to the edges of the block. The squeegees 8, 9, 9A and 10 under which the block has passed are stationary and strike the face of the block at about a 60° angle. The blade portions of the squeegees are of a suitable flexible material, such as 0.25 inch thick soft rubber. The function of the stationary squeegees 8–15 is to doctor the filler material through a wiping action into the voids and pores of the porous surface. This wiping action is best shown in Fig. 3.

As above indicated, squeegeeing to the extent thus far described has been found to be insufficient to prevent pin-holing and blistering, although quite satisfactory smoothness of the surface is obtained with the stationary squeegees alone.

The next squeegee set-up shown in Figs. 1 and 2 is a mechanically driven squeegee unit 16 having four flexible blade squeegees 17 affixed thereto. A device which may be used conveniently for this purpose is an air-driven sanding machine from which the sanding surface has been removed and having the squeegee assembly shown affixed in its place. This type of device provides a horizontal motion which is so rapid that it, at the same time, introduces a vertical component of motion. Any mechanical means for moving this portion of the squeegee assembly horizontally with respect to the block surface may be used. When in operation, the blades of the mechanically driven squeegee unit 16, like the stationary squeegees 8 through 15, are in pressure contact with the block face causing the flexible blades to bend at the point of contact. The end portions of the flexible blade squeegees 17 are preferably bent at approximately a 30° angle to the surface of the block so that the vertical component of motion is best utilized. However, any degree of bend in the end portions of the flexible blades may be employed which best suits the prevailing conditions. The rapid vibratory horizontal motion of the sanding machine head of unit 16, or other mechanical device, induces a vertical component of motion in the contacting edges of the bent blades of squeegees 17. This vertical component of motion together with the horizontal component of motion slaps, drags and forces filler down into the pores, breaking the resin bridges over the deeper pores, permitting trapped air to escape and causing more filler to be deposited in the pores. As the block leaves this phase of the filling operation, it then passes under stationary squeegees 11, 12, 12A (12 and 12A being angularly disposed as 9 and 9A), and 13 to smooth out the surface and add (from the roll of filler that builds up behind the squeegee) additional filler as may be required to replenish that which has been driven into the pores. It should be mentioned at this point that the squeegees employed serve a dual purpose. The first function of the squeegees is to serve as distributors of the filler material, whereby such material is evenly distributed across the entire face of the porous surfaces being treated. This is accomplished by moving the filler material back and forth across the face of the block or material being treated in order to keep filling and refilling all the ports. The second function of the squeegees is to serve as a reservoir for filler material. The excess filler material applied to the surface of the blocks is built up into banks ahead of each squeegee so that when a large depression or pore is encountered, there will always be sufficient material present at that point to substantially fill it. Here again, squeegee 12A cannot be seen in Figs. 1 and 2 but only in Fig. 3. A second similar mechanical squeegeeing action may be supplied if desired (as shown in Figs. 1 and 2) although it it required most usually in those cases where the blocks are very "tight."

A final series of stationary squeegees 14 and 15, which extend clear across the face of the blocks, follow such second mechanical squeegee unit and are employed for the purpose of smoothing the roughened surface and replenishing the filler that was driven into the pores.

It is also desirable in the squeegeeing operation to provide two side squeegees 18 for the purpose of removing any filler which has spilled over onto the sides of the blocks. If such filler is not removed by hand or by the method shown in the drawings, difficulty in handling, setting and mortaring joints may be experienced. The side squeegees 18, as shown in Figs. 1, 2 and 3, have been illustrated as being located after the last squeegees 14 and 15. Any other location of such side squeegees 18 may be employed provided that ridges which have been pushed up are not left on the surface of the blocks. Thus, the squeegees 18 may be placed between squeegees 14 and 15 so that squeegee 15 finally smooths out all ridges on the surface of coated blocks 3.

The portion of conveyor 2 which passes through the squeegee section or frame 1 is shown as being slightly downwardly dipped toward its center portion, indicated at 19 in Figs. 1 and 2. Stated in another way, the conveyor 2 may have a concave profile of large radius at the portion previously indicated. This dip or concave profile may be approximately one and one-half inches in ten feet of conveyor. The radius of the dip 19 in this case is about 50 feet. Here again, the dip or concave profile of conveyor 2 may be of any amount suitable to accommodate the material being treated, and should the conditions so demand, this dip or concave profile may be eliminated. However, it is preferred in most applications, to incorporate this feature into the conveyor. Thus, the blocks travel slightly downward in the first part of the squeegee section and slightly upward during passage through the second part. This arrangement keeps the top end edges of the blocks or similar material tightly in contact with one another while the bottom edges are slightly separated, thereby helping to prevent the flow of coating material between the blocks. In this manner, a separate squeegee action of removing material from the front and back edges of the block is eliminated.

Referring now more particularly to the design of the squeegee themselves, in Figs. 5 and 6 is shown a squeegee which is adjustable in three ways. This three-way adjustable squeegee, which has been shown for purposes of illustration only, has four major components. A rod portion 20 is flattened and drilled at 21. A body portion 22 is drilled and tapped at points 23 and 24 to receive bolts 25 and 26 which have large knurled knobs. The body portion 22 also has attached thereto by suitable means, two collars 27 and 28 adapted to receive a hinge pin 29. A hinge 30 is grooved at the upper portion 31 and has tubular portions 32 and 33 formed therein to receive the hinge pin 29. Thus, rod portion 20 is tightly clamped to the upper part of body portion 22 by inserting bolt 25 through hole 21 in rod portion 20 and into the threaded hole 23 of body portion 22. Rod portion 20 may be clamped to body portion 22 in any angle desired. Pin 29 is slipped through collar 27, then through hollow portions 32 and 33 of hinge 30 and finally into collar 28. A set screw 34 within collar 27 is used to retain hinge pin 29 securely in place. A bolt 26 having a large knurled knob is then placed within groove 31 of hinge 30 and into the threaded hole 24 of body portion 22. By placing a flexible rubber blade portion 35 of the squeegee between the lower portions of body portion 22 and hinge 30, the tension between these two portions may be adjusted by the manipulation of bolt 26 and the tightening of nut 36 toward the head of bolt 26. In order to make the squeegee simpler and adjustable only in two ways, bolt 25 may be eliminated and rod portion 20 may be welded or otherwise secured to body portion 22.

Referring back to Fig. 4, the stationary squeegees just described in detail are held in position in rack 4 on squeegee web bars or tie bars. Tie bars 37 and 39, shown in Fig. 4, have welded to their center portions clamping means 46, in this case a suitable solid cylinder drilled to a diameter capable of receiving the rod portion 20 of the squeegee and a set screw 41 to hold the squeegee in position and a set screw 42 to hold clamping means 46 in position. Tie bars 37 and 39 hold squeegees 8 and 10 in place, these squeeges being placed at right angles to the sides of the block. Squeegees 11, 13, 14 and 15 are held in place by similar clamping means and tie bars which are not shown. Squeegee web bar or tie bar 38 has adjustably attached thereto clamping units 49 and 50, which are similar to clamping units 46 and may be moved to any position on the tie bar 38. Thus, the tie bar 38 holds two squeegees 9 and 9A, which are positioned diagonally across the block and angled toward the center so that the ridges of filler material are rolled from the edges of the block to the center portion, where the squeegee 10 spreads the filler from the center outward across the block. The tie bars holding squeegees 8, 9, 9A, 10, 11, 12, 12A, 13, 14 and 15 are attached to rack 4 by any suitable means, and for purposes of illustration, have been shown attached by means of bolts 51 passing through holes in rack 4 and threading into the end portions of the tie bars.

A tie bar (not shown) of the same design as tie bar 38, previously described, is used to hold the two side squeegees 18 in any desired position with respect to the sides of the block. This tie bar, holding the two side squeegees 18, is attached to rack 4 in the same manner as the other tie bars.

The side squeegees 18, best shown in Figs. 2, 7 and 8, are composed of a Z-shaped rod portion 53 welded or otherwise secured to a hinge back plate 54. The hinge back plate 54 has permanently affixed thereto two collars 55 and 56, adapted to receive a slide pin 57. The upper portion of plate 54 has welded or otherwise secured at its upper portion a small projection or centering pin 58. Hinge clamp 59 has welded or otherwise secured at its upper portion and corresponding to the projection 58 in plate 54 a projection or centering pin 60, both projections or centering pins 58 and 60 being adapted to center and receive a hard drawn spring 61. The lower portion of hinge clamp 59 has two sleeves or round turned portions 62 and 63 welded or otherwise secured thereto adapted to cooperate with the collars 55 and 56 on plate 54 in receiving the slide pin 57. A small set screw 64 is positioned within collar 55 to retain pin 57 in place. To assemble the side squeegee assembly, pin 57 is placed through collar 55, sleeve or round turned portions 62 and 63 and collar 56. Set screw 64 is then tightened down to hold pin 57 in place and the spring 61 is placed between projections 58 and 60 of the hinge back plate 54 and the hinge 59 itself, thereby creating a yieldable pressure between the bottom portions of hinge clamp 59 and hinge back plate 54, holding a flexible squeegee blade 65 firmly in position. By the simple expedient of pressing together the upper portions of plate 54 and hinge 59, the tension on the flexible squeegee blade 65 is released and the blade 65 may be removed for replacement or cleaning.

The clamping units on the tie bar holding side squeegees 18 are adjusted to the proper width, depending on the type of black being treated, and then the two side squeegees 18 are inserted in place so that the edges of the block are wiped smooth to prevent pile up of filler on the sides.

Referring now to Figs. 9, 10 and 11, wherein is shown the mechanical vibrating squeegee unit generally indicated at 16, the unit furnishing the motion to the squeegees 17 (of which there are four to a unit) is shown to be an air-driven sanding machine from which the sanding surface has been removed and the squeegee assembly substituted therefor. However, any suitable means for vibrating the squeegees may be employed which introduces both a horizontal component and a vertical component of motion. Such air-driven sanding unit is indicated generally at 66 and is attached to tie bar 67 through mounting plate 68 and mounting bolts 69. Tie bar 67 has additional plates or stops 70 and 71 welded to each end of the tie bar and spaced apart slightly more than the width of the side of rack 4 so that the side of rack 4 fits in between stops or plates 70 and 71. Set screws 72 having knurled knobs are tapped into plates 70 so that by tightening the set screws 72 tie bar 67 is rigidly fixed to rack 4 in the desired position. The squeegee portion of the unit 16 is composed of four flexible bladed squeegees arranged in groups of two. Each of the two cast shoes 73 and 74, which are a part of the air-driven sander, has secured to its base portion two spacers 75 for each squeegee blade unit 17. Across these two spacers 75 is welded or otherwise securely fastened, a tube 76 having a slot 77 cut in the bottom portion thereof, leaving end portion 83 closed off, in which slot 77 is fitted, a back plate 78 having a tube welded at its top portion, which slide fits within tube 76. A set screw 81 is threaded into one end of tube 76 to hold back plate 78 locked in position against the closed end of member 76. The back plate 78 has two holes drilled in the lower portion thereof. It is to be noted that flexible rubber squeegee blade 79 has formed in its lower bottom edge, triangular cuts 80. Each squeegee blade 79 has cuts 80 in different positions so that when all of the squeegee blades are assembled, these cuts do not line up one behind the other, but are in a staggered relationship. The cuts 80 in flexible blade squeegees 17 are arranged in such a manner that every section of the block transversely is contacted by the mechanical vibrating squeegee blades. Thus, the possibility of channeling the filler material over the surface of the blocks leaving portions poorly filled or untouched is eliminated. Further, the flexible blade squeegees 17 are so positioned and of such length that one end thereof extends over only one edge of the block while the other end of flexible blade squeegees 17 does not extend clear to the other edge of the block. As shown in Fig. 3, the flexible blade squeegees 17 are arranged alternately so that one blade covers an edge of the block while the next squeegee 17 leaves the edge uncovered, etc. The flexible blade 79 is attached to back plate 78 by means of nut and bolt assembly 82. As stated before, each cast shoe 73 or 74 of the sander unit has two squeegee blade units 17 attached, making four in all. Any number may be employed, however, depending on the particular application and block to be treated.

In the practical operation of this invention, it is first necessary to place several blocks to be treated upon the conveyor system and adjust the various mechanisms to the block size. First the sander and dust remover (not shown) are adjusted, if used, so that the rough edges and top surface of the block are smoothed out and the loose particles removed. Then the spray gun 87 in filler spray booth 88 for applying the filler material to the block surface is adjusted so that the proper amount of filler is applied to the block surface, i. e., about 1.5 oz. per 8" x 16" face. After that, the blocks are placed within the squeegee unit and the rack 4 is raised or lowered by means of the chain hoist 7 which is connected to cross-bar 84, in order that the proper pressure is obtained between the flexible blades and the blocks. Next it is necessary to adjust the spray gun 89 within the final coating spray booth 90 so that a smooth layer of final coating material is applied having the proper thickness. After the complete unit has been adjusted to receive the particular type of block being treated, blocks are placed on the beginning of the conveyor and the conveyor and sander equipment are started. The blocks pass under the sander (not shown) whereby the top surface and edges are smoothed down and then pass into the filler booth 88 where the proper amount of material is sprayed onto the surface of the block by spray gun 87. The block then travels into the squeegee section indicated at 1 and the first squeegee 8, which has a length less than the width of the block, contacts the surface of the block and is positioned directly across the top of the block normal to the direction of motion. In this manner filler material is spread across the face of the block and two welts or ridges of material are left on the top surface of the block at the edges thereof. As the block is moved further down the line, the diagonal or angular squeegees 9 and 9A next contact the block. As stated before, these squeegees overlap the edges and are angularly disposed toward the center of the block. The filler material piled at the edges of the block is now rolled toward the center and one or two ridges or welts are formed there. The next squeegee 10 is similar to the first squeegee 8 and is positioned directly across the face of the block and spreads material back across the face thereof. The block now passes under the first vibrating unit 16, actuated by an air pressure supply (not shown) attached by air hose 85 to air valve 86, which sets up a combination of a horizontal component and vertical component of motion. In this way, the filler material is spread flat and slapped and forced down into the surface cavities of the block. This motion, however, leaves the surface rather rough and chopped up, making it necessary to pass through a stationary squeegee setup similar to that previously encountered; that is, squeegee 11 is first contacted and is directly across the face of the block but does not extend all the way to each edge. Then the two oblique squeegees 12 and 12A are contacted and they serve to move the filler material from the edges to the center of the block. Then squeegee 13 moves the material from the center of the block back across the entire face thereof. It is possible to finish off the squeegee operation at this point. However, for extremely smooth surfaces or where the conditions of the block demand it, it has been found helpful to add a second vibrating squeegee unit 16 which again performs the same function as the first one. To finish off the block which has been left slightly roughened by this vibrating motion of the second unit 16, two squeegees 14 and 15 are next encountered which are positioned to completely span the face of the block and spread the filler material evenly across the whole face thereof. The block then passes by the two side squeegees 18 and excess filler material is removed from the sides of block 3. The block then passes into the final coating state in spray booth 90 and on to drying units (not shown).

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A squeegee unit for filling porous blocks comprising an alternate series of stationary and vibratable squeegee means, and a conveyor for moving said blocks in contact with said squeegees, said conveyor including a concave profile of large radius whereby the upper edges of contiguous blocks are maintained in tight contacting relationship.

2. In a continuous operation block coating apparatus adapted to coat a porous surface having a conveyor system and coating material applying means, the improvements which include a squeegee unit comprising an alternating series of doctoring and vibrating squeegees with said conveyor system having a slight depression in the portion passing through said squeegee unit.

3. In a continuous operation block coating apparatus adapted to coat a porous surface including a conveyor system and coating material applying means, the improvements which include a squeegee assembly comprising a series of stationary doctoring blades adapted to move the coating material back and forth over the surface of said block, a set of vibrating squeegees adapted to force material into the pores of such porous surface being treated, followed by a series of stationary doctor blades similar to the first set of stationary doctor blades, with said conveyor system having a concave profile of large radius in the portion corresponding to the squeegee unit adapted to keep such blocks being treated in close contact along the top end edges during the squeegee operation.

4. In a continuous operation block coating apparatus adapted to coat a porous surface including a conveyor system and coating material applying means, the improvements which include a squeegee assembly comprising a series of stationary doctor blades arranged to move the coating material back and forth over the surface of said block, a vibrating squeegee unit adapted to force coating material into the pores of such porous surface, followed by another set of stationary doctor blades arranged to move the coating material back and forth over the surface of said block, with at least two side squeegees adapted to remove excess material from the side edges of the block, and said conveyor system being formed with a slight depression in its portion corresponding to said squeegee assembly adapted to prevent the flow of coating material between such blocks by keeping the top end edges in tight contact.

5. In a continuous operation porous block coating apparatus, the combination of a spray booth and spray means for applying filler material to the surface of said blocks, a squeegee unit for filling the pores of said porous blocks with such previously applied filler material comprising an alternate series of stationary and vibratable squeegee means, a conveyor for moving said blocks through said apparatus and in contact with said squeegees, said conveyor including a concave profile of large radius in the area below said squeegee unit whereby the upper edges of contiguous blocks are maintained in tight contact relationship, and a second spray booth and spray means for applying a final coat of coating material, said conveyor then moving such coated blocks to an area for drying.

6. In a continuous operation porous block coating apparatus, the combination of a spray booth and spray means for applying filler material to the surface of said blocks, a squeegee unit comprising a series of flexible stationary doctor blades and flexible vibrating squeegee blades adapted to force such filler material into the pores of such porous surface blocks, followed by another set of flexible stationary doctor blades, with at least two flexible side squeegees adapted to remove excess material from the side edges of the block, and a conveyor for moving said blocks through said apparatus and in contact with said squeegees, said conveyor including a concave profile of large radius in the area below said squeegee unit whereby the upper edges of contiguous blocks are maintained in tight contact relationship, and a second spray booth and spray means for applying a final coat of coating material.

7. In a continuous operation porous block coating apparatus, the combination of a spray booth and spray means for applying filler material to the surface of said blocks, a squeegee unit comprising a series of flexible stationary doctor blades and flexible vibrating squeegee blades adapted to force such filler material into the pores of such porous surface blocks, followed by another set of flexible stationary doctor blades with at least two flexible side squeegees adapted to remove excess filler material from the side edges of the block, and a conveyor power driven only at the beginning portion thereof whereby said porous blocks are pushed through the remainder of said conveyor in tight contact with one another, said conveyor including a concave profile of large radius in the area below said squeegee unit whereby the upper edges of contiguous blocks are maintained in tight contact relationship, and a second spray booth and spray means for applying a final coat of coating material.

References Cited in the file of this patent

UNITED STATES PATENTS

| | | |
|---|---|---|
| 249,762 | Haverstick | Nov. 22, 1881 |
| 1,983,180 | McCarthy | Dec. 4, 1934 |